United States Patent
El Sayyed et al.

(10) Patent No.: US 10,783,453 B2
(45) Date of Patent: Sep. 22, 2020

(54) SYSTEMS AND METHODS FOR AUTOMATED INCIDENT RESPONSE

(71) Applicant: JPMorgan Chase Bank, N.A., New York, NY (US)

(72) Inventors: Hani El Sayyed, Bournemouth (GB); Gary Ford, Winchester (GB); Kevin Thomas, Dorset (GB); Daniel J. Christian, Bournemouth (GB); Salwa Husam Alamir, Bournemouth (GB); Simon Bench, Bournemouth (GB); Ian Maile, Poole (GB)

(73) Assignee: JPMorgan Chase Bank, N.A., New York, NY (US)

(*) Notice: Subject to any disclaimer, the term of this patent is extended or adjusted under 35 U.S.C. 154(b) by 717 days.

(21) Appl. No.: 15/622,749

(22) Filed: Jun. 14, 2017

(65) Prior Publication Data
US 2019/0228342 A1    Jul. 25, 2019

Related U.S. Application Data

(60) Provisional application No. 62/349,953, filed on Jun. 14, 2016.

(51) Int. Cl.
  *G06N 20/00* (2019.01)
  *G06N 7/00* (2006.01)
  *G06F 16/25* (2019.01)

(52) U.S. Cl.
  CPC ........... *G06N 20/00* (2019.01); *G06F 16/254* (2019.01); *G06N 7/005* (2013.01)

(58) Field of Classification Search
  CPC ..................................................... G06F 21/552
  USPC ......................................................... 706/15, 45
  See application file for complete search history.

(56) References Cited

U.S. PATENT DOCUMENTS

| | | | |
|---|---|---|---|
| 8,819,047 B2* | 8/2014 | Cucerzan | G06F 16/951 707/761 |
| 2011/0270604 A1* | 11/2011 | Qi | G06F 16/3344 704/9 |
| 2014/0351176 A1* | 11/2014 | Jan | G06N 5/048 706/12 |
| 2017/0212756 A1* | 7/2017 | Ryali | G06F 8/60 |

* cited by examiner

*Primary Examiner* — David R Vincent
(74) *Attorney, Agent, or Firm* — Hunton Andrews Kurth LLP

(57) ABSTRACT

Systems and methods for automated incident response are disclosed. In one embodiment, a method for managing response to an incident may include (1) receiving training incident data from a training data source; (2) identifying at plurality of incident-related training keywords in the training data; (3) receiving one of a plurality of tags for each of the plurality of training keywords from a trainer; (4) executing a machine learning process to associate the received tags with the training keywords; (5) receiving incident data related to an incident from an incident data source; (6) identifying a plurality of incident-related keywords in the incident data; (7) automatically tagging the incident-related keyword with one of the plurality of tags; (8) automatically identifying at least one incident pattern from the tags; (9) automatically retrieving a solution for the incident based on similar resolved incidents; and (10) automatically applying the solution to the incident.

18 Claims, 3 Drawing Sheets

SYSTEMS AND METHODS FOR AUTOMATED INCIDENT RESPONSE

RELATED APPLICATIONS

This application claims priority to U.S. Provisional Patent Application Ser. No. 62/349,953, filed Jun. 14, 2016, the disclosure of which is hereby incorporated, by reference, in its entirety.

BACKGROUND OF THE INVENTION

1. Field of the Invention

The present disclosure generally relates to systems and methods for automated incident response.

2. Description of the Related Art

Technology incidents can have a variety of causes. For example, hardware failures, network connectivity issues, software bugs, etc. may cause significant disruptions within an organization, leading to a loss in productivity.

SUMMARY OF THE INVENTION

Systems and methods for automated incident response are disclosed. In one embodiment, a method for managing response to an incident may include at least one computer processor in an incident response system performing the following: (1) receiving training incident data from a training data source; (2) identifying at plurality of incident-related training keywords in the training data; (3) receiving one of a plurality of tags for each of the plurality of training keywords from a trainer; (4) executing a machine learning process to associate the received tags with the training keywords; (5) receiving incident data related to an incident from an incident data source; (6) identifying a plurality of incident-related keywords in the incident data; (7) automatically tagging the incident-related keyword with one of the plurality of tags; (8) automatically identifying at least one incident pattern from the tags; (9) automatically retrieving a solution for the incident based on similar resolved incidents; and (10) automatically applying the solution to the incident.

In one embodiment, the machine learning process is a Term Frequency-Inverse Document Frequency process.

In one embodiment, the method may further include receiving at least one search term for searching the incident data; identifying at least one prior incident in the incident data responsive to the at least one search term; calculating a relevancy score between the search term and at least one prior incident; and outputting an identification of the at least one prior incident and the relevancy score.

In one embodiment, natural language processing or cosine similarity is used to measure a similarity between the at least one search term and incident data for the at least one prior incident.

In one embodiment, the solution may include a workaround.

In one embodiment, the incident data source may include a centralized incident data repository, a hardware source and a software source, an incident chat transcript, an incident voice file, and an incident text report, etc.

In one embodiment, the method may further include automatically enriching the incident data with enrichment data.

In one embodiment, the enrichment data may identify at least one of a weekend incident, a beginning of the day incident, an end of the day incident, and an end of month incident.

In one embodiment, the method may further include clustering the incident with at least one prior incident.

In one embodiment, the incident may be clustered with at least one prior incident using a hierarchical clustering algorithm or a K-means clustering algorithm.

In one embodiment, the method may further include identifying at least one prior incident that is similar to the incident.

In one embodiment, the solution may comprise a software patch.

According to another embodiment, a system for managing response to an incident may include an incident response system comprising at least one computer processor and comprising a training engine and a learning engine; at least one source of training data, at least one source of incident data, an incident data repository, and at least one user interface. In one embodiment, the training engine may receive training incident data from the source of training data, identify a plurality of incident-related training keywords in the training data, receive one of a plurality of tags for each of the plurality of training keywords from a trainer, and execute a machine learning process to associate the received tags with the training keywords. The learning engine may receive incident data related to an incident from the source of incident data, identify a plurality of incident-related keywords in the incident data, and automatically tag the incident-related keyword with one of the plurality of tags. The incident system may automatically identify at least one incident pattern from the tags, automatically retrieve a solution for the incident based on similar resolved incidents in the incident data repository, and automatically apply the solution to the incident.

In one embodiment, the incident response system may receive at least one search term for searching the incident data from the user interface, identify at least one prior incident in the incident data responsive to the at least one search term, calculate a relevancy score between the search term and at least one prior incident, and output an identification of the at least one prior incident and the relevancy score to the user interface.

In one embodiment, natural language processing or cosine similarity may be used to measure a similarity between the at least one search term and incident data for the at least one prior incident.

In one embodiment, the incident data source may include a centralized incident data repository, a hardware source, a software source, an incident chat transcript, an incident voice file, an incident text report, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
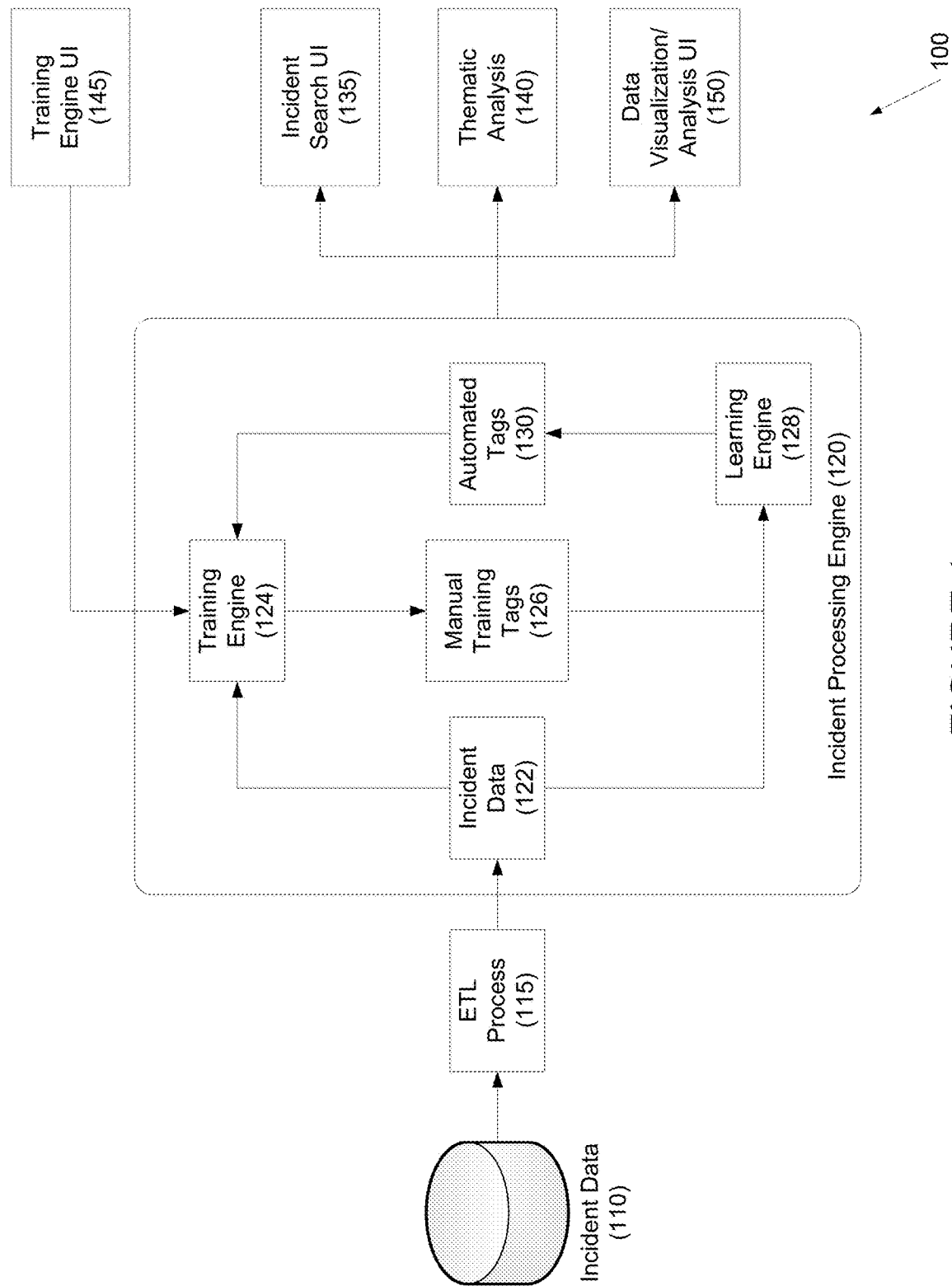
FIG. 1 depicts a system for automated incident response according to one embodiment.

Embodiments disclosed herein related to systems and methods for automated incident response.

In one embodiment, one goal of an incident management process is to restore normal service operation of a computer system as quickly as possible following an incident, and to minimize the impact of the incident on the operation of an organization that uses the computer system.

In addition, in one embodiment, information may be collected during an incident, and that information may be used to improve the incident management process. In one embodiment, machine learning may be used to improve the process. Additionally, changes that are made to the incident response system may be sustainable.

In one embodiment, when an active incident occurs, the incident response system may advise software, management, information technology personnel, users, etc. of similar incidents that occurred previously. It may also provide information that was used to resolve (or in an attempt to resolve) the previous incidents, an identification of individuals/resources involved in the resolution or attempt, etc.

In one embodiment, the incident response system may improve its effectiveness by collecting and/or analyzing learning/techniques/behaviors across multiple incidents to improve the incident management process.

Embodiments disclosed herein collect incident data and any other related data to process, modify, enhance, classify, analyze and/or cluster the data for the purposes of matching new incidents to the processed data to assist with diagnosis, recovery, and/or resolution of the new incident. In addition, the collection, processing and clustering of similar incidents may identify common thematic issues that may be reviewed and addressed to proactively prevent further occurrences of those type of incidents.

In embodiments, data may be collected from an incident management system, change management system, and any other related data sources. This data may be configured and processed by components including, for example, statistical methods, predictive analytics, machine learning, etc. In one embodiment, user interfaces may be used to configure, review, and modify any or all of the components to refine and improve the overall capability of the solution.

Embodiments may include a plurality of functional modules to execute the solution, including, for example, a data extraction process, a machine learning and data enhancement process, an analytics process, a reporting and metrics process, and a search engine. Other functional modules may be used as is necessary and/or desired.

In one embodiment, the data extraction process may extract data from the identified source system(s) and ensure that the extract is successful and all data is complete and stored successfully.

In one embodiment, the machine learning and data enhancement process may process selected incident data already in the system and identified as training data to process and tag all new incident data items. The processed data may then be available to the other processes.

In one embodiment, the machine learning and data enhancement process may include a user interfaces to allow review and modification of the enhanced data and to define the set of data elements to be used on future machine learning cycles.

In one embodiment, the analytics process may process the incident and related data and the machine learning enhanced data using predictive analytics algorithms to identify patterns and clusters of similar incidents. The analytics process may include a user interface to define and select the set of incident data to be processed and the combination of algorithms and processes to be performed on the defined data set.

In one embodiment, the analytics process may allow a user to perform searches sorts on the data and add user defined data enrichment to the selected incidents. Any selection of data created by a combination of machine analysis and manual processing and enrichment may be labelled for future reference. Such a selection may also be labelled and stored in such a form that it can be provided as a new or refined input into the machine learning and data enhancement process and applied to an extended set of the data.

In one embodiment, the reporting and metrics process may include a set of configurable metrics and reports to show the overall data set and the results and outputs from the machine learning and analytics processes.

In one embodiment, the search engine may provide the capability to select one or more data attribute with user defined weights and find matching incident records. The data attributes may include text-based data fields that can be selected and weighted to be included for contextual search.

In one embodiment, the output may include a ranked set of incidents with a percentage match to the defined criteria. Additional sub-filters may also be applied.

In one embodiment, the results interface may allow a user or users to mark any records for review and update if the incident data is considered to need correction.

Referring to FIG. 1, an architectural diagram for a system for automated incident response is provided according to one embodiment.

In one embodiment, architecture 100 may include one or more source 110 for incident data, extract, transfer, and load (ETL) process 115, incident processing engine 120, incident search 135, and thematic analysis 140.

In one embodiment, source 110 may be any suitable source for incident data. For example, source 110 may be a centralized incident data repository, such as the HP Service Manager (HPSM), a centralized production reporting tool, etc. In another embodiment, source 110 may include hardware sources, software sources, chat transcripts, voice messages, incident reports, etc. In one embodiment, incident processing engine 120 may use one or more application programmable interface (API) to retrieve incident data.

In one embodiment, source 110 may be a source of training data.

In one embodiment, the data in source 110 may be unstructured data.

In one embodiment, ETL process 115 may be used to prepare the data for use by incident processing engine 120. ETL process 115 may be an optional process. Other processes may be used as is necessary and/or desired to prepare the data for incident processing engine 120, if necessary.

In one embodiment, data may be extracted from fields in the data from source 110 that are most likely to include meaningful data. For example, data related to time, data, user, application, incident description, systems involved, etc. may be extracted. Other data may be extracted as is necessary and/or desired.

In one embodiment, following extraction, the extracted incident data may be stored in an incident database (not shown) in incident engine 120.

Incident processing engine 120 may process incident data 122 from source(s) 110. In one embodiment, incident processing engine 120 may include incident data 122, training engine 124, manual training tags 126, learning engine 128, and automated tags 130. In one embodiment, incident data may be processed by training engine 124 or by learning engine 128.

In one embodiment, incident data 122 may be received and processed by training engine 124, where it may be manually reviewed and tagged 126. In one embodiment, only training data may be manually reviewed; actual incident data may be automatically processed without manual intervention.

In one embodiment, the manual tagging may be used as part of a machine learning process so that learning engine may apply automated tags 130.

Learning engine 128 may receive incident data 122 and manually tagged incident data from manual tagging 126, and may automatically assign one or more automated tags 130 to words/phrases in incident data 122.

In one embodiment, logic may be applied by either training engine 124 or learning engine 128 to enrich the data. For example, the logic may enrich the data based when in the week the incident occurred (e.g., weekend, beginning of the week, end of the week, holiday, etc.), the time of day that the incident occurred (e.g., beginning of day, end of day, etc.), time of the month that the incident occurred (e.g., beginning of the month, end of the month, etc.), relationship to other events (e.g., at startup, following update, etc.), or any other data as is necessary and/or desired.

In one embodiment, the output of automated tags 130 may be fed back to training engine 124 for manual review of the tagging. In one embodiment, the tagged incident data may be stored in a database (not shown).

Incident search user interface (UI) 135 may provide access to search the tagged incident data database. In one embodiment, a user may search incident data in any suitable manner (e.g., keyword, system, date/time, etc.). In one embodiment, searching may be performed in any suitable manner, including combinations of items. In one embodiment, the search results may include a configuration to modify the priority and/or significance of the search criteria, and the results will be viewable based upon a percentage match (e.g., relevancy score).

Thematic analysis 140 may analyze the tagged and/or enriched incident data to identify one or more theme. For example, the tags and/or enriched data may identify one or more incident theme, such a commonality among multiple incidents (e.g., systems involved, software involved, users involved, time of day, day of week, day of the month, update status, etc.).

In one embodiment, training engine 124 may have training engine user interface 145. Training engine user interface 145 may be used to manage, edit, and selecting the items for manual training tags, and to review and edit the automated tags.

In one embodiment, data visualization/analysis user interface 150 may be provided. In one embodiment, data visualization/analysis user interface 150 may provide output regarding tags, themes, relevancy scores, etc.

In one embodiment, data visualization/analysis user interface 150 may provide visualization data for a number of use cases from one or more component of incident processing engine 120. For example, it may provide visualization of incident data 122 to review and modify incidents used by training engine 124, or submitted to learning engine 128. It may provide visualization for manual training tags 126 to review and modify training tags. It may provide visualization for automated tags 130 to review and modify automated tags as a result of learning engine 128. It may provide visualization for training engine 124 to review and modify training tags by training engine user interface 145. It may provide visualization of learning engine 128 for the review of the accuracy and effectiveness of learning engine 128 performance with training data. It may provide visualization of system status, data, and usage based on any of incident data 122, manual training tags 126, and automated tags 130 as is necessary and/or desired. Other visualizations may be provided as is necessary and/or desired.

Figure 2:
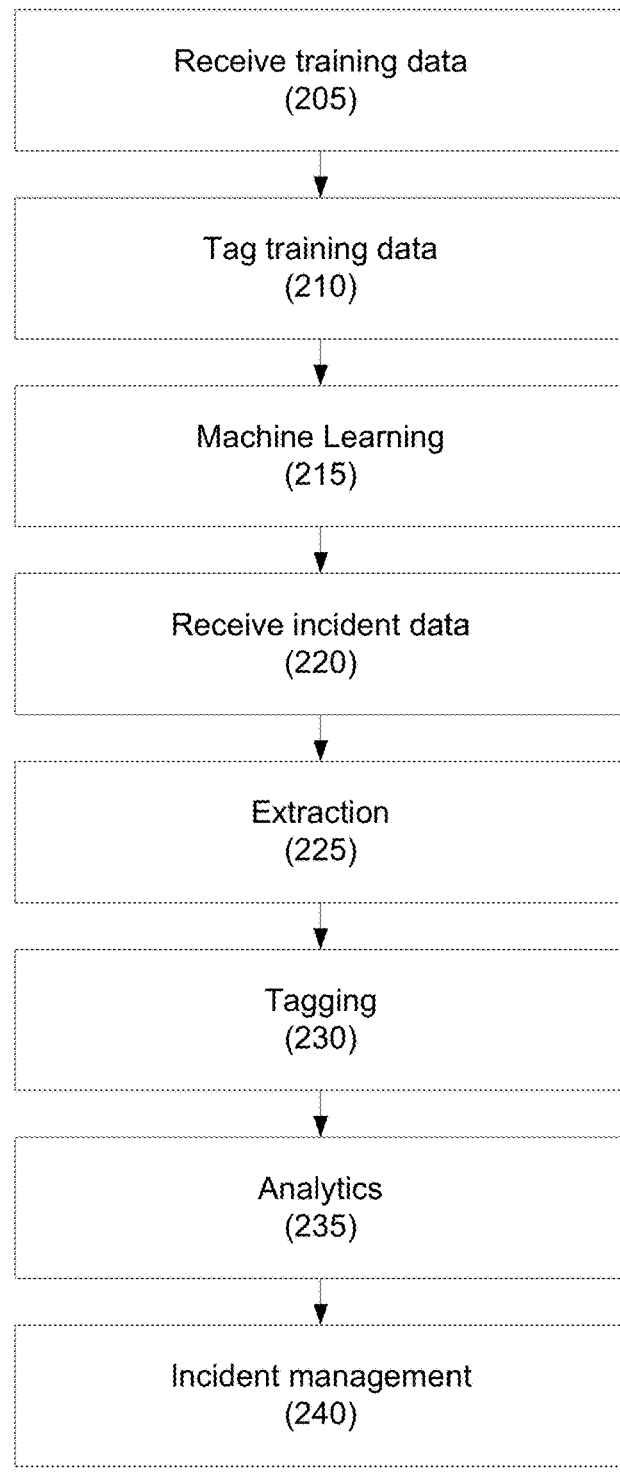
FIG. 2 depicts a processing flow for automated incident response according to one embodiment.

Referring to FIG. 2, a method for automated incident response is disclosed according to one embodiment. In step 205. training data may be received. In one embodiment, the training data may be for one or more past incidents, for a current incident that is being manually processed, or it may be synthetic data for training purposes only. Any other suitable type or source of data, or combinations thereof, may be used as necessary and/or desired.

In step 210, words and/or phrases in the training data may be tagged.

In one embodiment, data may be extracted from the training data. Various extraction techniques may be used, including, for example, Term Frequency-Inverse Document Frequency (TFIDF) may be used, and a lexicon, including terms and phrases that are relevant to the art, may be used. Other techniques or combination of techniques, including key word or phrase matching, field extraction, etc. may be used as is necessary and/or desired.

In one embodiment, a trainer may review the training data and assign one or more tags to words or phrases in the training data. Any suitable manner of tagging the training data may be used as is necessary and/or desired. For example, any suitable tag words may be used to tag the words/phrases in the tagging data. The following tags, and associated words/phrases are provided as examples only:

| Tag | Exemplary Words and Phrases |
| --- | --- |
| 'Change' | 'Change', 'Configure', 'Configuration', 'Deployment', 'Install', 'ITSM', 'New', 'Onboard', 'Patch', 'Reconfigure', 'Release', 'Request' |
| 'Database' | 'Database', 'DB', 'DBA', 'MySQL', 'Oracle', 'SQL', 'Sybase', 'Table' |
| 'Duplicate' | 'Double', 'Duplicate' |
| 'End User' | 'Client', 'Customer', 'External Party', 'GEM Desk', 'Merchant', 'Retail', 'Third Party', 'Trader', 'User' |
| 'EOD' | 'Close of Business', 'COB', 'End of Day', 'EOD', 'Evening', 'Overnight' |
| 'External' | 'Bloomberg', 'Clearing House', 'COMEX', 'External', 'LME', 'NYNEX', 'OpenLink', 'Partner', 'Party', 'Reuters', 'Sungard', 'Third Party', 'Vendor' |
| 'Feed Related' | 'Batch', 'Deliver', 'Delivery', 'Downstream', 'Feed', 'File', 'Flow', 'Imported', 'Inbound', 'Loading', 'Message', 'Messaging', 'Outbound', 'Payments', 'Reach', 'Receive', 'Receiving', 'Send', 'Sent', 'STP', 'Stream', 'Transmission', 'Transaction', 'Upstream' |
| 'File Transfer' | 'File Mover', 'FTP', 'Messaging Queue', 'MQ', 'NDM', 'SFTP', 'Tibco' |
| 'Holiday' | 'Holiday', 'Long Weekend', 'Vacation' |
| 'Invalid Data' | 'Bad', 'Corrupt', 'Discrepancy', 'Inaccurate', 'Incorrect', 'Incorrectly', 'Invalid', 'Mismatched', 'Poisonous', 'Truncated', 'Unrecognize', 'Wrong' |
| 'Job Failure' | 'Autosys', 'ControlM', 'Fail', 'Failure', 'Fatal', 'Job', 'Kill', 'Rejection', 'Unable' |
| 'Latency' | 'Blocked', 'Deadlock', 'Degradation', 'Delay', 'Extended', 'Hang', 'Hung', 'Latency', 'Long', 'Slow', 'Slower', 'Stall', 'Stale', 'Stuck', 'Timeout', 'Times Out', 'Unresponsive' |
| 'Market' | 'Bond', 'Currency', 'Deal', 'Equity', 'FX', 'Investor', 'Investment', 'Market', 'Order', 'P&L', 'Prices', 'Pricing', 'Quote', 'Rate', 'RFQ', 'Stock', 'Trade', 'Trader', 'Wires' |
| 'Missing' | '404', 'Cannot Find', 'Disappear', 'Missing', 'Not Available', 'Unavailable' |
| 'Memory' | 'Cache', 'Memory', 'RAM' |

-continued

| Tag | Exemplary Words and Phrases |
|---|---|
| 'Network' | 'Cisco', 'Connect', 'Connection', 'Connectivity', 'Disconnect', 'Firewall', 'Network', 'Online', 'Reconnect', 'Router', 'Service Down', 'Switch' |
| 'Operations' | 'Client Service', 'Customer Service', 'Operational', 'Operations', 'Ops' |
| 'OS/Server/ HW' | 'Cluster', 'File System', 'Hardware', 'Host', 'Linux', 'Mainframe', 'Node', 'Operating System', 'OS', 'Server', 'Plex', 'Unix', 'Windows' |
| 'Performance' | 'Cap', 'Capacity', 'CPU', 'GB', 'Maxed', 'MB', 'Overload', 'Performance', 'Size', 'Space', 'Volume' |
| 'Permissions' | 'Access', 'Account', 'Entitlement', 'EPV', 'Locked', 'Login', 'Password', 'Permission', 'Privileges', 'Read Only', 'Register', 'Registration', 'Sign In', 'Unlock' |

In step 215, based on the tagging, the automated incident response system may use machine learning to learn the appropriate tags for certain words and phrases.

In step 220, raw incident data for an incident may be received. In one embodiment, the raw incident data may be received from any suitable source and in any suitable format. For example, raw incident data may be received from an incident management system (e.g., HP Service Manager Incident Management (HPSM), a centralized production reporting tool, etc.). In another embodiment, the automated incident response system may query systems (e.g., hardware, software, etc.) for raw incident data using, for example an API. In another embodiment, raw incident data may be received from a service (e.g., IT Helpdesk). In another embodiment, raw incident data may be received by email, voice message, chat transcript, etc.

In one embodiment, the raw incident data may be collected automatically. In another embodiment, the raw incident data may be entered manually, by dictation, extracted from audio files, etc. In another embodiment, a combination of automated and manual data entry may be provided.

The raw incident data may identify the incident type (e.g., equipment failure, software error, database crashes, security compromises, denial of service attacks, etc.), an identification of the hardware/software involved, the date/time of the incident, the state of the machine at the time of the incident (e.g., CPU usage, memory usage, disk usage, number of threads executing, number of programs executing, etc.), the impact of the incident (e.g., application or device inaccessible, device rebooted, etc.). Other data may be collected as is necessary and/or desired.

In one embodiment, the raw incident may be assigned an incident identifier.

In one embodiment, the automated incident response system may be agnostic to the source and/or manner in which the raw incident data is received.

In one embodiment, processed incident data may also be received. For example, if the incident was reported manually, the incident data may be provided in fields (e.g., date, time, incident description, etc.).

Next, in step 225, relevant data may be extracted from the raw incident data. In one embodiment, the raw incident data may be traversed to extra date, time, location, user information, software information, equipment identification, as well as a description of the incident. Additional relevant data may be extracted as is necessary and/or desired.

In one embodiment, the extracted data may be stored in an incident database.

In step 230, the extracted data may be analyzed and tagged. For example, in one embodiment, the words or phrases in the extracted data may be automatically tagged with one or more tag based using the machine-learned tagging data.

In one embodiment, the extracted data may be enriched with additional data. For example, the tagged data and/or incident may be enriched with additional data, such as a weekend, beginning of the day, end of the day, holiday, etc. For example, it may be useful to know whether an incident occurred at a certain time of the day, day of the month, on a weekend, etc. Thus, based on the timing of the incident, the tagged data and/or incident may be automatically enriched with an indicator that it occurred at period of interest.

In one embodiment, natural language processing may also be used.

Other enrichments may be provided as is necessary and/or desired.

In one embodiment, the tagged and/or enriched extracted data may be stored in the incident database. In one embodiment, if certain extracted data could not be tagged, it may be identified for manual review. In another embodiment, if certain extracted data could not be tagged, it may be discarded. Any suitable manner of handing untagged and/or unenriched data may be used as is necessary and/or desired.

In step 235, analytics may be applied to the tagged and/or enriched data in order to identify an incident pattern. For example, this may involve identifying incidents having one or more common tags in order to develop a cause/effect relationship (e.g., when program X is executed at time Y, incident Z occurs). As another example, this may identify conditions that result in one or more incidents occurring. Any patterns may be identified in any manner as is necessary and/or desired.

In one embodiment, the analytics may further include other unsupervised machine learning processes to group and cluster the incidents. In one embodiment, clustering algorithms, such as Hierarchical or K-Means may be used as is necessary and/or desired.

In one embodiment, incidents having similar tags or similar enrichment data may be clustered. In one embodiment, this may identify a theme for the incident. The theme may identify a recurring cause for an incident.

In step 240, incident management may be performed. For example, the incident may evaluated against prior incidents in order to identify a close match. In one embodiment, natural language processing and cosine similarity may be used to measure the similarity or likeness of textual fields. In one embodiment, prior to being checked for similarity, data may be pre-processed using, for example, using publicly-available lexicons, lexicons that are relevant to the art, etc., to eliminate punctuation, to add stemming, etc. In one embodiment, an incident matching relevancy score, indicating a match with prior incident(s), may be provided.

In another embodiment, incidents may be searched using an incident search user interface.

Figure 3:
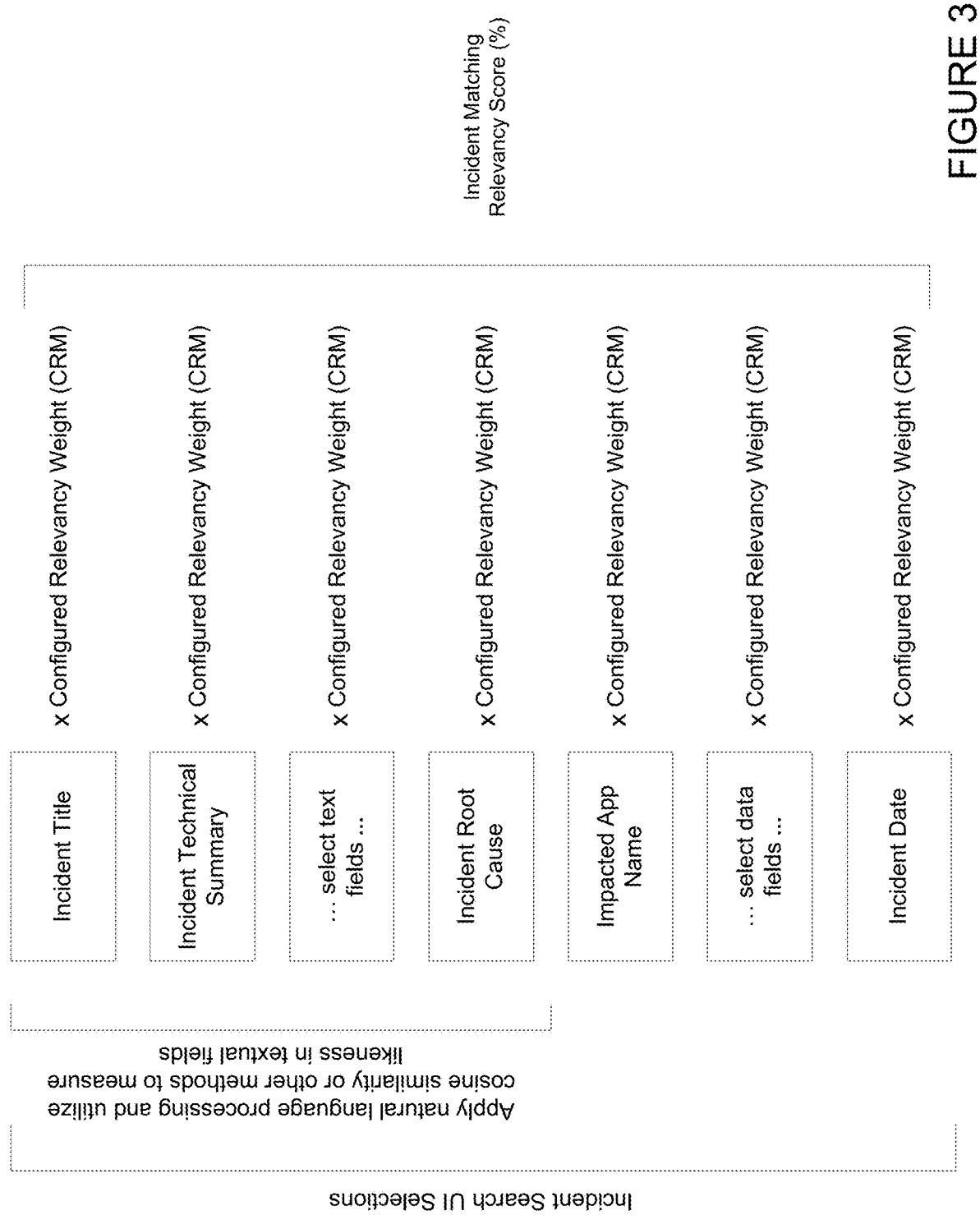
FIG. 3 depicts a relevancy score according to one embodiment.

Referring to FIG. 3, a relevancy score process is disclosed according to one embodiment. In FIG. 3, a plurality of incident data fields that may be accessed using the incident search user interface (e.g., incident title, incident technical summary, select text fields, incident root cause, impacted app name, select data fields, and incident data) may be provided. Additional incident data fields, different incident data fields, or fewer incident data fields, may be used as is necessary and/or desired.

In one embodiment, the entry in some or all incident data fields may be analyzed to determine likeness with other incidents. In one embodiment, incident title, incident technical summary, select text fields, incident root cause may be analyzed.

For example, natural language processing and cosine similarity or other methods may be used to measure likeness in textual fields.

In one embodiment, the checking of certain incident data fields may only be activated as necessary. For example, if there is a 0% chance of matching a title or technical summary, title or technical summary field matching may not be performed.

In one embodiment, each incident data field may be weighted based on a configured relevancy weight (CRW). The CRW may be used to weight the similarity of each incident data field based on its relevance. Based on the CRW weighting, an incident matching relevancy score, which may be provided as a percentage, may be returned.

In one embodiment, the incident data may be modeled. In one embodiment, the incident data criteria may be weighted, and a testing model may be applied and assessed. For example, each field may be assigned a weighting in order to aid in identifying a relevant prior incident.

The incident may evaluated against prior incidents in order to identify a close match. In one embodiment, natural language processing and cosine similarity may be used to measure the similarity or likeness of textual fields. In one embodiment, prior to being checked for similarity, data may be pre-processed to eliminate punctuation, to add stemming, etc. using, for example, using publicly-available lexicons, lexicons that are relevant to the art, etc.

In one embodiment, data on how similar incident were previously resolved may be retrieved. In one embodiment, this may identify processes to resolve the incident, workarounds to employ while a solution is researched, identification of individual(s) involved in previous resolutions, etc.

In one embodiment, the solution may involve the application of a software patch.

In one embodiment, the incident processing engine may select the most relevant prior resolution steps and may automatically execute the steps to resolve the incident. In one embodiment, a human may be required to verify, or authorize, the repair steps before they are taken.

In one embodiment, the solution(s) employed, the individuals involved, and the results may be stored in the incident database.

In one embodiment, reports may be generated. This may include providing metrics such as tag frequency, themes, etc.

In one embodiment, the evaluation may be visualized using, for example, a tree-map based web application. In embodiment, the incident owner or responsible party may select one of the prior incidents and may see the resolution steps taken to resolve the prior incident.

In one embodiment, following resolution, the models may be refined. In one embodiment, the refinement may be based on user input, automated data gathering (e.g., system functionality restored or not restored, machine learning, etc.). In one embodiment, the refinement may be reflected in changing the weightings discussed above.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a cardholder or cardholders of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "cardholder interfaces" may be utilized to allow a cardholder to interface with the processing machine or machines that are used to implement the invention. As used herein, a cardholder interface includes any hardware, software, or combination of hardware and software used by the processing machine that allows a cardholder to interact with the processing machine. A cardholder interface may be in the form of a dialogue screen for example. A cardholder interface may also include any of a mouse, touch screen, keyboard, keypad, voice reader, voice recognizer, dialogue screen, menu box, list, checkbox, toggle switch, a pushbutton or any other device that allows a cardholder to receive information regarding the operation of the processing machine as it processes a set of instructions and/or provides the processing machine with information. Accordingly, the cardholder interface is any device that provides communication between a cardholder and a processing machine. The information provided by the cardholder to the processing machine through the cardholder interface may be in the form of a command, a selection of data, or some other input, for example.

As discussed above, a cardholder interface is utilized by the processing machine that performs a set of instructions such that the processing machine processes data for a cardholder. The cardholder interface is typically used by the processing machine for interacting with a cardholder either to convey information or receive information from the cardholder. However, it should be appreciated that in accordance with some embodiments of the system and method of the invention, it is not necessary that a human cardholder actually interact with a cardholder interface used by the processing machine of the invention. Rather, it is also contemplated that the cardholder interface of the invention might interact, i.e., convey and receive information, with another processing machine, rather than a human cardholder. Accordingly, the other processing machine might be characterized as a cardholder. Further, it is contemplated that a cardholder interface utilized in the system and method of the invention may interact partially with another processing machine or processing machines, while also interacting partially with a human cardholder.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for managing response to an incident, comprising:
    at least one computer processor in an incident response system performing the following:
        receiving training incident data from a training data source;
        identifying at plurality of incident-related training keywords in the training data;
        receiving one of a plurality of tags for each of the plurality of training keywords from a trainer;
        executing a machine learning process to associate the received tags with the training keywords;
        receiving incident data related to an incident from an incident data source;
        identifying a plurality of incident-related keywords in the incident data;
        automatically tagging the incident-related keyword with one of the plurality of tags;
        automatically identifying at least one incident pattern from the tags;
        automatically retrieving a solution for the incident based on similar resolved incidents;
        automatically applying the solution to the incident;
        receiving at least one search term for searching the incident data;
        identifying at least one prior incident in the incident data responsive to the at least one search term;
        calculating a relevancy score between the search term and at least one prior incident; and
        outputting an identification of the at least one prior incident and the relevancy score.

2. The method of claim 1, wherein the machine learning process is a Term Frequency-Inverse Document Frequency process.

3. The method of claim 1, wherein natural language processing or cosine similarity is used to measure a similarity between the at least one search term and incident data for the at least one prior incident.

4. The method of claim 1, wherein the solution comprises a work-around.

5. The method of claim 1, wherein the incident data source comprises a centralized incident data repository.

6. The method of claim 1, wherein the incident data source comprises at least one of a hardware source and a software source.

7. The method of claim 1, wherein the incident data source comprises an incident chat transcript, an incident voice file, and an incident text report.

8. The method of claim 1, further comprising:
    automatically enriching the incident data with enrichment data.

9. The method of claim 8, wherein the enrichment data identifies at least one of a weekend incident, a beginning of the day incident, an end of the day incident, and an end of month incident.

10. The method of claim 1, further comprising:
    clustering the incident with at least one prior incident.

11. The method of claim 10, wherein the incident is clustered with at least one prior incident using a hierarchical clustering algorithm or a K-means clustering algorithm.

12. The method of claim 1, the method may further comprise identifying at least one prior incident that is similar to the incident.

13. The method of claim 1, wherein the solution comprises a software patch.

14. A system for managing response to an incident, comprising:
    an incident response system comprising at least one computer processor and comprising a training engine and a learning engine;
    at least one source of training data;
    at least one source of incident data
    an incident data repository; and
    at least one user interface;
    wherein:
        the training engine receives training incident data from the source of training data;
        the training engine identifies a plurality of incident-related training keywords in the training data;
        the training engine receives one of a plurality of tags for each of the plurality of training keywords from a trainer;
        the training engine executes a machine learning process to associate the received tags with the training keywords;
        the learning engine receives incident data related to an incident from the source of incident data;
        the learning engine identifies a plurality of incident-related keywords in the incident data;
        the learning engine automatically tags the incident-related keyword with one of the plurality of tags;
        the incident response system automatically identifies at least one incident pattern from the tags;
        the incident response system automatically retrieves a solution for the incident based on similar resolved incidents in the incident data repository;
        the incident response system automatically applies the solution to the incident;
        the incident response system receives at least one search term for searching the incident data from the user interface;
        the incident response system identifies at least one prior incident in the incident data responsive to the at least one search term;
        the incident response system calculates a relevancy score between the search term and at least one prior incident; and
        the incident response system outputs an identification of the at least one prior incident and the relevancy score to the user interface.

15. The system of claim 14, wherein natural language processing or cosine similarity is used to measure a similarity between the at least one search term and incident data for the at least one prior incident.

16. The system of claim 14, wherein the incident data source comprises a centralized incident data repository.

17. The system of claim 14, wherein the incident data source comprises at least one of a hardware source and a software source.

18. The system of claim 14, wherein the incident data source comprises an incident chat transcript, an incident voice file, and an incident text report.

* * * * *